United States Patent [19]

Proctor et al.

[11] Patent Number: 4,537,788

[45] Date of Patent: Aug. 27, 1985

[54] EGG JERKY PRODUCT AND METHOD OF PREPARATION

[75] Inventors: Valerie A. Proctor, Manhattan; Franklin E. Cunningham, Leonardville, both of Kans.

[73] Assignee: Kansas State University Research Foundation, Manhattan, Kans.

[21] Appl. No.: 579,580

[22] Filed: Feb. 13, 1984

[51] Int. Cl.$^3$ .............................................. A23L 1/32
[52] U.S. Cl. .................................. 426/614; 426/656; 426/802
[58] Field of Search ............... 426/614, 802, 641, 645, 426/646, 656

[56] References Cited

U.S. PATENT DOCUMENTS

| | | | |
|---|---|---|---|
| 3,953,611 | 4/1976 | Youngquist | 426/802 X |
| 4,000,323 | 12/1976 | Youngquist | 426/802 X |
| 4,061,784 | 12/1977 | Youngquist | 426/802 X |
| 4,239,785 | 12/1980 | Roth | 426/646 X |
| 4,250,198 | 2/1981 | Millar et al. | 426/802 X |

FOREIGN PATENT DOCUMENTS 814319  3/1981  U.S.S.R. ............................ 426/614

Primary Examiner—Robert Yoncoskie

[57] ABSTRACT

There is disclosed a product and a process for preparing a jerky-type product from whole eggs, flavoring ingredients and with or without added textured vegetable protein. A fluid mixture containing at least about 35% by weight of hydrated whole eggs is coagulated as a flat sheet having an average thickness of about 1 to 10 millimeters. The coagulated flat sheet is dried to a moisture level of 18 to 24% by weight having a water activity below 0.8. There is obtained a final product of elongated strips characterized by a flexible, deformable and chewy condition.

7 Claims, No Drawings

EGG JERKY PRODUCT AND METHOD OF PREPARATION

FIELD OF INVENTION, BACKGROUND, AND PRIOR ART

The field of this invention is the preparation of jerky-type products, and more particularly products of this kind which can be prepared without using meat as an essential ingredient. Meat jerky products are a well known type of snack food. They are marketed in sticks or strips which can be stored without refrigeration. These products have a moisture content at which they are storable while retaining a malleable, chewy character. They are usually very highly seasoned, and commonly are smoked or have added smoke flavor. They are packaged in moisture-retaining casings or wrappers to maintain the desired consistency.

While the formulas of such products have varied with respect to ingredients and proportions, it is believed that jerky-type products have heretofore included meat as a principal ingredient, and they have not, as far as is known, included eggs as an essential component of the formula.

SUMMARY OF INVENTION

This invention is based on the discovery that a simulated meat jerky product can be prepared without using meat as an ingredient, providing that whole eggs are used as a major component. Surprisingly, a chewy malleable texture can be obtained by forming the base mixture into sheets or other shapes, applying heat to coagulate the egg protein, and drying the sheets or strips made therefrom to a storable moisture content. The texture is further improved by incorporating textured vegetable protein. By adding flavoring ingredients to the base mix of the kind used in jerky products, a taste very similar to that of meat jerky products can be obtained. The products can be packaged in vapor retaining packages and marketed in a manner similar to meat jerky.

The novel method of this invention can be used to produce a highly nutritious shelfstable snack item in which the eggs provide a rich source of high-quality protein. In comparison to beef jerky, the egg jerky products of this invention can be produced at a lower ingredient cost. Relatively low cost egg sources can be used such as pasteurized whole frozen eggs. The egg jerky products can be smoked or smoke added to the formula as with meat jerky products.

DETAILED DESCRIPTION

A preferred formula for the egg jerky products of this invention is as follows:

| General Formula | |
| --- | --- |
| Ingredients | Wt. % |
| Whole eggs | 35–65 |
| Textured vegetable protein | 10–30 |
| Jerky seasonings | 15–35 |

It is believed to be important to employ whole eggs, including both egg protein and egg lipid components. When whole eggs are employed in the amounts specified, some additional egg whites may be added. The preferred formulas utilize only egg ingredients in the form of uncooked hydrated whole eggs. If dried whole eggs are used, they should be rehydrated before use. From the standpoint of cost and convenience, pasteurized whole frozen eggs are advantageous.

The textured vegetable protein (TVP) selected from the commercial products currently available in which the vegetable protein, such as soy protein, has been processed, such as by extrusion, to impart a fibrous structure. Textured soy protein (TSP) is preferred. Such TVP products are prepared by extruding vegetable meals of high protein content (viz. soybean, peanut, and cottonseed meals) under head and pressure to restructure the protein to a fibrous condition. See U.S. Pat. Nos. 3,940,495; 3,480,442; and 3,488,770. Commercial TVP products are available from Ralston Purina Company, St. Louis, MO, and ADM Company, Minneapolis, MN. In certain embodiments the textured vegetable protein can be omitted, since the whole eggs provide a chewy type consistency when processed as described herein.

The seasoning ingredients are those commonly employed in jerky products, such as beef jerky. They include spices like paprika, coriander, black pepper, etc. Salt may be added and may be hickory flavored slat, and also monosodium glutamate (MSG) may be used. Vegetable seasonings may be used such as onion powder, chili powder, etc. as well as prepared seasonings like Worcestershire sauce and soy sauce. Sweetening ingredients may be included such as corn syrup. Smoke flavor may be obtained by adding liquid smoke, or by smoking the product. For protection against microbial contamination, calcium propionate may be added to the base mixture, or the products may be dipped in a potassium sorbate or lysozyme solution.

As a first step in the process, a blended fluid mixture is prepared consisting essentially of uncooked hydrated whole eggs, textured vegetable protein, and flavoring ingredients. The mixture should contain at least 1.5 parts of the eggs per part of TVP, and preferably at least 2.0 parts. In one procedure, the liquid whole eggs are blended, and then the seasoning ingredients are added, which may be in the form of a dry spice mix or a liquid spice mix. If the textured vegetable protein is dehydrated, it should be rehydrated, and thereafter added to the egg-spice mixture. After further mixing and blending, the formulation is ready to be further processed.

The fluid mixture formed as described above can be formed into flat sheets or strips either manually or mechanically. For example, shallow trays can be used to provide the means for forming the mixture into sheets. The thickness of the sheets can be controlled by the depth of the mix. In general, it is desirable to produce thin sheets, such as sheets of a thickness less than 20 millimeters. To permit the sheets to be handled, a thickness of at least 1 mm is desirable. The general range of advantageous thickness is from 1 to 10 mm, such as 2 to 5 mm. As the next step in the method, the mix is heated to solidify and integrate the sheets. In general, the heating should be at a non-burning temperature sufficient to coagulate the egg protein. Suitable temperatures range from about 150° to 200° F., depending on the time of heating. It may be advantageous to use a two stage heating, such as an initial heating at a temperature of around 200° F. for a time of from 10 to 20 minutes to coagulate the egg, followed by a longer heating such as at a temperature of around 150° F. for several hours, to evaporate water. The degree of heating should not be such as to produce undue discoloration or offtastes due to burning of the protein or lipids. After a first period of heating, it may be desirable to turn the sheets for subsequent drying. The heating and drying should be controlled, to avoid forming tough or case hardened surface layers.

On completion of the coagulation and integration of the mix in sheet form, the sheets may be cut into strips for further processing. The cut strips can then be subjected to a drying operation. The drying should be carried out at a temperature and with drying equipment which avoids alteration of the character of the products. The drying is for water removal and not for cooking. Temperatures no more than 135°–150° F. are desirable. Even lower temperatures can be used with vacuum drying. The drying is carried to a point at which the moisture content of the sheets or strips is in the range from about 18 to 24% by weight. To assure stability under non-refrigerated storage, the water activity should be below 0.8.

In one procedure, the sheets are partially dried to an intermediate moisture content above 24%, and then the sheets are sliced or cut into strips. The strips are then subjected to further drying to the moisture content and water activity specified above. This procedure has the advantage of producing strips with edges which are sealed and have the same appearance as the top and bottom of the strips. However, in general, the sheets may be sliced into strips before, during, or after drying.

Where smoke flavor has not been added to the mix before formation of the strips, they may be smoked in a smokehouse. On completion of smoking, the strips should have the moisture content and water activity specified above.

The products resulting from the process described have physical properties which simulate meat jerky products such as beef jerky. The egg jerky strips are in a flexible, deformable, chewy condition, and can be maintained in this condition by proper packaging. A vapor-impermeable packaging material should be used, which may be in the form of bags, envelopes, or casings. Vacuum packaging may be desirable.

A presently preferred embodiment of the method of this invention is as follows:

| Mix Formula | |
|---|---|
| Ingredients | Parts by Weight |
| Whole homogenized eggs | 148 |
| Textured soy protein | 61.1 |
| Worcestershire sauce | 19.4 |
| Soy sauce | 13.0 |
| Onion powder | 0.9 |
| Chili powder | 1.4 |
| Monosodium glutamate | 0.3 |
| Paprika | 0.4 |
| Beef flavoring | 5.9 |
| Coriander | 0.3 |
| Black pepper | 1.2 |
| Dark corn syrup | 14.1 |
| Liquid smoke | 26.6 |
| Hickory flavored salt | 0.8 |

The above ingredients are blended to form a substantially homogeneous mixture. The completed mix is then poured into greased pans (12 in. × 10 in.) to approximate depth of 3.0 mm. The pans are baked in a conventional oven for 15 minutes at 200° F. At this point, the sheets are sufficiently integrated to permit them to be removed from the pans. The sheets can be sliced, or the sheets can be dried, and sliced after drying. For example, the drying may be carried out in a conventional oven at a temperature of around 150° F., the drying being continued for several hours, such as for 5 hours, or until the moisture content is around 22% by weight. The final water activity is preferably in the range from 0.6 to 0.7. As an alternative to oven drying, the integrated sheets, or cut strips, may be dried in a smokehouse, such as at a temperature of around 134° F. for 6 to 7 hours. If smokehouse drying is to be used, liquid smoke can be omitted from the mix. The completed sheets or strips should be flexible and be deformable to provide a definite chewy character when eaten.

In the formula set out above, and following the process conditions as described, including the conventional oven drying, products were obtained having average moisture contents of around 22% and an average water activity ($A_w$) of 0.655. These figures were based on averages of several determinations.

The above formula can be modified by omitting the textured soy protein and correspondingly increasing the amount of whole eggs. Processing is otherwise identical.

We claim:
1. A method of producing a meatless jerky-type product from whole eggs, comprising:
    (a) preparing a blended fluid mixture comprising at least about 35% by weight of uncooked hydrated whole eggs, said mixture also containing flavoring ingredients;
    (b) spreading said mixture in the form of flat sheets having an average thickness of from about 1 to 10 millimeters;
    (c) heating said sheets at non-burning temperatures sufficient to coagulate the egg protein and integrate said mixture;
    (d) drying the integrated mixture to a moisture content of from about 18 to 24% by weight, said mixture on completion of the drying having a water activity below 0.8 and being further characterized by a flexible, deformable, chewy condition; and
    (e) before, during or after step (d), slicing said sheets into elongated strips to produce a jerky-type product.

2. The method of claim 1 in which said mixture contains from 35 to 65% by weight of whole eggs and from 10 to 30% textured vegetable protein.

3. The method of claim 1 in which said integrated sheet is partially dried, sliced, and the resulting strips further dried to obtain the moisture content and physical characteristics specified in step (d).

4. The method of claim 1 in which said sheet has average thickness of from about 2 to 5 mm.

5. A method of producing a meatless jerky-type product comprising:
    (a) preparing a blended fluid mixture consisting essentially of uncooked hydrated whole eggs, textured soy protein (TSP), and flavoring ingredients, said mixture containing from 40 to 60% by weight of said whole eggs and from 15 to 25% of said TSP, at least 2 parts of the eggs being present per part of TSP;
    (b) spreading said mixture in the form of flat sheets having an average thickness of from about 2 to 5 millimeters;
    (c) heating said sheets at a non-burning temperature sufficient to coagulate the egg protein and integrate said mixture;

(d) slicing said sheets into elongated strips;

(e) drying said strips to a moisture content of from about 18 to 24% by weight, said strips on completion of the drying having a water activity below 0.8 and being in a flexible, deformable, chewy condition; and (f) packaging said strips in water vapor retaining packages.

6. The jerky-type product produced by the method of claim 1.

7. The jerky-type product produced by the method of claim 5.

* * * * *